US007710884B2

(12) United States Patent
Liu et al.

(10) Patent No.: US 7,710,884 B2
(45) Date of Patent: May 4, 2010

(54) METHODS AND SYSTEM FOR DYNAMIC REALLOCATION OF DATA PROCESSING RESOURCES FOR EFFICIENT PROCESSING OF SENSOR DATA IN A DISTRIBUTED NETWORK (75) Inventors: Zhen Liu, Tarrytown, NY (US); Donald F. Towsley, Amherst, MA (US); Honghui Xia, Briarcliff Manor, NY (US); Lei Ying, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/469,640

(22) Filed: Sep. 1, 2006

(65) Prior Publication Data

US 2008/0056291 A1 Mar. 6, 2008

(51) Int. Cl.
*H04L 12/26* (2006.01)
*H04L 12/28* (2006.01)
(52) U.S. Cl. .......................... 370/238; 370/254; 707/6; 707/101; 707/103; 707/104.1; 709/224
(58) Field of Classification Search ....................... None
See application file for complete search history.

(56) References Cited

U.S. PATENT DOCUMENTS

| 5,870,763 | A * | 2/1999 | Lomet ........................ 707/202 |
| 6,735,630 | B1 * | 5/2004 | Gelvin et al. ............... 709/224 |
| 6,934,699 | B1 * | 8/2005 | Haas et al. .................... 707/2 |
| 2002/0161917 | A1 * | 10/2002 | Shapiro et al. .............. 709/238 |
| 2003/0023534 | A1 * | 1/2003 | Kadambe ..................... 705/36 |
| 2005/0249215 | A1 * | 11/2005 | Kelsey et al. ............... 370/392 |
| 2006/0015529 | A1 * | 1/2006 | Yagawa .................. 707/104.1 |
| 2007/0022092 | A1 * | 1/2007 | Nishizawa et al. ............. 707/2 |
| 2007/0060143 | A1 * | 3/2007 | Bhatti ........................ 455/445 |
| 2007/0201371 | A1 * | 8/2007 | Chou et al. .................. 370/237 |

OTHER PUBLICATIONS

Bonfils, et al. "Adaptive and Decentralized Operator Placement for In-Network Query Processing". F. Zhao and L. Guibas (Eds.): IPSN 2003, LNCS 2634, pp. 47-62, 2003.
Shahid H. Bokhari. "A Shortest Tree Algorithm for Optimal Assignments Across Space and Time in a Distributed Processor System". IEEE Transactions on Software Engineering, vol. SE-7, No. 6, Nov. 1981. pp. 583-589.
Srivastava, et al. "Operator Placement for In-Network Stream Query Processing". PODS 2005 Jun. 13-15, 2005, Baltimore Maryland.
Pietzuch, et al. "Network-Aware Operator Placement for Stream-Processing Systems". Division of Engineering and Applied Science, Harvard University.

* cited by examiner

*Primary Examiner*—Seema S Rao
*Assistant Examiner*—Steven Wood
(74) *Attorney, Agent, or Firm*—Cantor Colburn LLP; Kenneth Corsello (57) ABSTRACT

Methods and system for dynamic reallocation of data processing resources for efficient processing of sensor data in a distributed network is provided. The methods and system include determining a data transmission cost $f_t$; determining a data processing cost $f_p$; determining a data storage cost $f_s$; and determining a data query Q which minimizes $f(f_t+f_p+f_s)$ for a system of networked data processing resources.

6 Claims, 10 Drawing Sheets

Method 1 For $q = 1$
1: for each node $i$ do
2:   for each node $k$ do
3:     $C_p(k,t) = 0$ if data $k$ is sensor data created at node $i$, and $C_p(k,t) = $ otherwise:
4:     $I(k,i) = 1$;
5: while true do
6: for each node $i$ do
7:   for each node $k$ do
8:     if $I(k,i) = 1$ then
9:       Send data $k$'s states to its neighbors;
10:       $I(k,i) = 0$
11: for each node $i$ do
12:   for each data object $k$ (bottom-up along the query tree) do
13:     for each $j \in \Phi_i$ do
14:       if (node $t$ receives data $k$'s stats from node $j$) AND $C_p(k,t) > C_p(k,i) + Dtr1\ (j,i))$, then
15:         $C_p(k,i) = C_p(k,j) + Dtr1\ (j,i)$;
16:         $F_p(k,i) = j, \Pi_p(k,i) = 0$, and $I(k,i) = 1$;
17:     if $C_p(k,i) > r_p(k,i) + \Sigma_{m \in \Delta}\colon C_p(m,i)$; then
18:       $C_p(k,i) > r_p(k,i) + \Sigma_{m \in \Delta}\colon C_p(m,i)$;
19:       $F_p(k,i) = i, \Pi_p(k,i) = 1$, and $I(k,i) = 1$.

FIG. 9

Method 2 Initialize network's states
1: for each node $i$ do
2:   for each node $j$ do
3:     $R(i,j) = \infty$ if $j = i$, and $R(i,j) = 0$ otherwise;
4:     $lb\ (j = i) = 1$;
5:   for each data object $k$ do
6:     $I(k,i) = 1$;
7:     if data $k$ is the sensor data created at node $i$ then
8:       $C_p(k,i) = 0$
9:       $C_s(k,i) = D_{krs}(i)$;
10:     else
11:       $C_p(k,i) = C_s(k,i) = \infty$

FIG. 10

Method 3 For general $q < 1$.
1: Initialized the states at each node using Method 2;
2: while true do
3:    for each node $i$ do
4:       if $Ib\ (i,\ j) = 1$ then
5:          Send $R\ (i,\ j)$ its neighbors, and let $Ib\ (i,\ j) = 0$;
6:       for each data $k$ do
7:          if $I\ (k,\ i) = 1$ then
8:             Send data $k$'s states to its neighbors, and let $I\ (k,i) = 0$;
9:    for each node $i$ do
10:       for each $h\ 6=\ i$ do
11:          for each $j \in \Phi_i$ do
12:             if node $i$ receives $R(j,h)$ and $R(j,h) + r_j\ (i,\ j) < R(j,h)$ then
13:                 Let $R(i,h) = r_j\ (i,\ j) + R(j,h)$, $G(i,h) = j$, and $Ib(t,h) = 1$;
14:       for each data object $k$ (bottom-up along the query tree) do
15:          for each $j \in \Phi_i$ do
16:             if node $i$ receives data $k$'s states from node $j$ then
17:                 if $Cp\ (k,i) > Cp\ (k,\ j) + Dir_j\ (j,i)$ then
18:                    Let $Cp\ (k,i) = Cp(k,\ j) + Dir_j\ (j,i)$;
19:                    Le $Fp(k,i) = j$, $\Pi p(k,i) = 0$, and $I\ (k,i) = 1$;
20:               if $Cs\ (k,\ i) > Cs\ (k,\ j) + q(Dir_j(j,i) + DqR(i,\ j))$ then
21:                  Let $Cs\ (k,i) = Cs\ (k,\ j) + q(Dir_j\ (j,i) + DqR(i,\ j))$.
22:                  Let $Fs\ (k,i) = j$, $\Pi s(k,i) = 0$, $\Omega(k,i) = 0$, and $I\ (k,i) = 1$;
23:             if $Cp\ (k,i) > rp\ (k,i) + \Sigma_m \in \Delta: Cp\ (m,i)$ then
24:                Let $Cp\ (k,i) = rp\ (k,i) + \Sigma_m \in \Delta: Cp\ (m,i)$;
25:                Let $Fp(k,i) = i$, $\Pi p(k,i) = 1$, and $I\ (k,i) = 1$;
26:             if $Cs\ (k,\ i) > qrp\ (k,i) + \Sigma_m \in \Delta: Cs\ (k,i)$ then
27:                Let $Cs\ (k,i) = qrp\ (k,i) + \Sigma_m \in \Delta: Cs\ (m,i)$.
28:                Let $Fs\ (k,i) = i$, $\Pi s\ (k,i) = 1$, $\Omega(k,i) = 0$, and $I\ (k,i) = 1$;
29:             if $Cs\ (k,\ i) > Cp\ (k,i) + Dirs\ (i)$ then
30:                Let $Cs\ (k,i) = Cp(k,i) + Dirs\ (i)$.
31:                Let $\Pi s(k,i) = \Pi p(k,i)$, $Fs\ (k,i) = Fp(k,i)$, $\Omega(k,i) = 1$, and $I\ (k,i) = 1$;

FIG. 11

Method 4 Asynchronous version of method 1

1: for each node $i$ do
2:    for each data object $k$ do:
3:       Let $C_p(k,i) = 0$ if data $k$ is sensor data created at node $i$, and $C_p(k,i) = \infty$ otherwise;
4:       Send data $k$'s states to node $i$'s neighbors;
5:    while true do
6:    At each node $i$:
7:    loop
8:       if (node $i$ receives the updated information of data $k$ from node $f$) AND $(C_p(k,i) > C_p(k,j) + Dir_j(j,i))$ then
9:          Let $C_p(k,i) = C_p(k,j) + Dir_j(j,i)$, $F_p(k,i) = j$, $\Pi_p(k,i) = 0$;
10:       Send data $k$'s states to node $i$'s neighbors;
11:       for data $k$'s ancestors $ka$ (bottom-up starting from data $k$) do
12:          if $C_p(ka,i) > r_p(ka,i) + \Sigma_{m \in \Delta}: C_p(m,i)$ then
13:             Let $C_p(ka,i) = r_p(ka,i) + \Sigma_{m \in \Delta}: C_p(m,i)$, $F_p(ka,i) = i$, and $\Pi_p(ka,i) = 1$;
14:          Send data $ka$ states to node $i$'s neighbors;

FIG. 12

Theorem 1 *Algorithm 1 converges to the optimal solution of Problem (3) after at most $M(N-1)$ iterations, and the number of messages exchanged is $O(M_2N_3)$.*

Proof: Denote $\Gamma p(k,i)$ the minimum cost needed to obtain data $k$ at node $i$, among all paths $\beta$ $(k,i)$ such that $H(\beta(k,i)) \leq n$.

Note that if data $k$ is generated at node $i$, then $\Gamma p(k,i) = r_p(k,i) + \Sigma_{m \in \Delta} \Gamma p(m,i)$; If data $k$ is obtained from one of node $i$'s neighbors, then $\Gamma p(k,i) = \min_j \phi : Dir : (j, i) + \Gamma p\text{-}1(k,j)$ Thus.

$$\Gamma pn(k, i) = \min rp(k,i) + \sum_{m \in \Delta:} \Gamma pn(m,i), \min_{j \in \phi:} Dir: (j, i) + \Gamma pn\text{-}1(k, j)$$

Since $\{\beta(k,i) : H(\beta(k,i)) \leq n-1\} \subset \{\beta(k,i) : H(\beta(k,i)) \leq n\}$, it follows that $\Gamma pn(k,i) \leq \Gamma p\text{-}1(k,i)$.

Let $Cpn(k,i)$ denote the cost obtained after $n$ iterations; we show by induction on $n$ that
$$Cpn(k, i) = \Gamma p(k,i).$$

We first prove equation (1) for data $k$ such that $\Delta := /0$. In this case, $$\Gamma pn(k, i) = \min rp(k,i). \quad \min_{j \in \phi:} Dir: (j, i) + \Gamma pn\text{-}1(k, j)$$

Equation (1) follows trivially for $n = 0$. Now suppose after the $(n-1)$th iteration, we have $Cp\,n\text{-}1(k,i) = \Gamma p\text{-}1(k,i)$ for all $i$. Then, by executing lines 14-16 of Method 1 shown in FIG. 9, we obtain $$Cpn(k, i) = \min Cp\text{-}1(k,i), rp(k, i), \min_{j \in \phi:} Dir: (j, i) + \Gamma pn\text{-}1(k, j)$$

$$= \min \Gamma p_{\text{-}1}(k,i), rp(k, i), \min_{j \in \phi:} Dir: (j, i) + \Gamma pn\text{-}1(k, j)$$

$$= \min \min rp(k,i), \min_{j \in \phi:} Dir: (j, i) + \Gamma pn\text{-}2(k, j)$$

$$rp(k, i), \min_{j \in \phi:} Dir: (j, i) + \Gamma pn\text{-}1(k, j)$$

Since $\Gamma p_{\text{-}2}(k, j) \geq \Gamma pn\text{-}1(k, j)$, we conclude that $$Cpn(k, i) = \min rp(k,i), \min_{j \in \phi:} Dir: (j, i) + \Gamma pn\text{-}1(k, j) \quad = \Gamma pn(k, i).$$

Now consider data $k$ such that $\Delta : 6=/0$. Suppose $Cp\text{-}1(k,i) = \Gamma p\text{-}1(k,i)$ for all $i$, and $Cp(m,i) = \Gamma p(m,i)$ for all $m \in \Delta:$. Then, according to lines 13-19 of Method 1 (FIG. 9), it can be shown that $$Cpn(k, i) = \min Cp\text{-}1(k,i), rp(k,i) + \sum_{m \in \Delta:} \Gamma pn(m,i),$$

$$\min_{j \in \phi:} Dir: (j, i) + \Gamma pn\text{-}1(k, j)$$

$$= \Gamma pn(k, i).$$

FIG. 13

Theorem 2 *Method 3 converges to the optimal solution of Problem 1 after at most $N + M(N-1)$ iterations, and the number of messages exchanged is $O(M2N3)$.*

Proof: Suppose $q < 1$, and define $\Gammaس (k,j)$ to be the minimum cost to get data $k$ at node $i$ among data collection trees for data $k$ rooted at node $i$ such that $H(\beta(k,i)) \leq n$. There are three choices to obtain data $k$ at node $i$:

(i) Data $k$ is cached at node $i$, which means data $k$ is pushed to node $i$ and stored there. Thus, $\Gamma s_n(k,i) = \Gamma p(k,i) + Dir:(i)$.

(ii) When the query is injected, node $i$ obtains data $k$ from one of node $i$'s neighbors, e.g., node $j$. Then $\Gamma s(k,i) = \Gamma s\text{-}1(k,j) + q(Dir:(j,i) + DqR=j)$, where $R=ij$ is the minimum cost to transmit one unit data from node $i$ to node $j$. note that $R=ij \quad =Y:(i,j)$ since the direct link may not be the minimum cost path.

(iii) When the query is injected, node $i$ generates data $k$ from its children. Then, $\Gamma s_n(k,i) = q_{rp}(k,i) + \Sigma_{m \in \Delta} : \Gamma s(m,i)$.

Thus, we have
$$\Gamma s_n(k,i) = \min \Gamma p(k,i) + Dir:(i), q_{rp}(k,i) + \Sigma_{m \in \Delta:} \Gamma s_n(m,i),$$
$$\min_{j \in \phi:} q(Dir:(j,i) + DqR=j) + \Gamma s\text{-}1(k,j)$$

By induction on $n$, we show that
$$Cs_{N+n}(k,i) \leq \Gamma s(k,i). \qquad (2)$$

First it is easy to see that $Cs_{n+1}(k,i) \leq Cs(k,i)$ for all $k$ and $i$, and $Cso(k,i) = \Gamma s(k,i)$. Thus, we have $Cs_N(k,i) \leq \Gamma so(k,i)$. Also, it has been shown that the distributed Bellman-Ford algorithm terminates after $N$ iterations [3], so $Rn(i,j) = R=j$ for $n \geq N$. $\Gamma s(k,i)$ Now consider data $k$ such that $\Delta: = /0$, and assume that $Cs +n\text{-}1(k,i) \leq \Gamma s\text{-}1(k,i)$ holds for all $i$. By executing lines 20-22 and lines 29-31 of Method 3, we then have
$$Cs_{N+n}(k,i) = \min Cs_{N+n\text{-}1}(k,i), q_{rp}(k,i), C_{p+n}(k,i) + Dir:(i),$$
$$\min Cs_{N+n\text{-}1}(k,j) + q(Dir:(j,i) + DqR=(i,j))$$

It has been shown in Theorem 1 that $Cp \ N+n(k,i) = \Gamma p+n(k,i) \leq \Gamma p(k,i)$, thus
$$Cs \ N+n(k,i) \leq \min \min_{j \in \phi:} \Gamma s \ n\text{-}1(k,j) + q(Dir:(j,i) + DqR=(i,j))$$
$$\Gamma s \ n\text{-}1(k,i), q_{rp}(k,i), \Gamma p(k,i) + Dir:(i)$$
$$\leq \min \min_{j \in \phi:} \Gamma s_{n\text{-}1}(k,j) + q(Dir:(j,i) + DqR=(i,j))$$
$$q_{rp}(k,i), \Gamma pn(k,i) + Dir:(i))$$
$$= \Gamma s_n(k,i).$$

Now consider data $k$ such that $\Delta: = /0$. Assume $Cs +n\text{-}1(k,i) \leq \Gamma s\text{-}1(k,i)$, and $Cs \ N+n\text{-}1(m,i) \leq \Gamma s\text{-}1(m,i)$ for all $m \in \Delta:$. Then, by executing lines 20-22 and lines 26-31 of Algorithm 3, it can be shown that $Cs \ N+n(k,i) \leq \Gamma s(k,i)$. By induction on $n$ and on the query tree, we conclude that equation (5) holds for all $n$, data $k$ and node $i$.

Thus, the algorithm converges to the optimal solution of Problem 1 after at most $N + M(N-1)$ iterations, and the number messages exchanged is $O(M2\text{-}N3)$.

METHODS AND SYSTEM FOR DYNAMIC REALLOCATION OF DATA PROCESSING RESOURCES FOR EFFICIENT PROCESSING OF SENSOR DATA IN A DISTRIBUTED NETWORK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to data networks and more particularly to efficient distributed processing of network sensor data.

2. Description of the Related Art

Recent advances in computer technology and wireless communications have enabled the emergence of stream-based sensor networks. Broad applications include network traffic monitoring, real-time financial data analysis, environmental sensing, large-scale reconnaissance, surveillance, etc. In these applications, real-time data are generated by a large number of distributed sources, such as sensors, and must be processed, filtered, interpreted or aggregated in order to provide useful services to users. The sensors, together with many other shared resources, such as Internet hosts and edge servers, are organized into a network that collectively provides a rich set of query processing services. Resource-efficient data management is a key challenge in such stream-based sensor networks.

Two different approaches are commonly used in the prior art for managing and processing data in such networks. The first approach involves setting up a centralized data warehouse (e.g. data fusion center) to which sensors push potentially useful sensor data for storage and processing. Users can then make a variety of sophisticated queries on the data stored at this central database. Clearly, this approach does not make efficient use of resources because all data must be transmitted to the central data warehouse whether or not it is of interest. Moreover, this may require a large investment in processing resources at the warehouse while at the same time that processing resources within the network are under utilized.

The second approach involves pushing queries all the way to the remote sensors. Such querying of remote sensor nodes is generally more bandwidth efficient. However, it is greatly limited by the low capability, low availability and low reliability of the edge devices such as sensors.

Thus, a third approach, and an object of an embodiment of the present invention, pushes query processing into the network as necessary is desirable in order to reduce data transmission and better utilize available shared resources in the network. Furthermore, given that various queries are generated at different rates and only a subset of sensor data may be actually queried, caching some intermediate data objects inside the network advantageously increases query efficiency.

In addition, most distributed stream processing systems in the prior art avoid the placement problem and assume that operator locations are pre-defined, and thus are unable to adapt to varying network conditions. In-network query processing has mostly focused on the operator placement problem. At least one prior art solution considered the placement of operators so as to improve performance by balancing load where the communication bandwidth has not been taken into consideration. Another prior art solution considered queries involving only simple operations like aggregation. In this case, the communication cost dominates and it is feasible to perform all operations as close to the sensors as possible. Yet another prior art solution considered queries involving more sophisticated operations with non-negligible computational costs, and developed an operator placement algorithm for the special case in which the query graph is a sequence of operations and the sensor network is a hierarchical tree.

Other prior art solutions considered the operator placement problem for tree-structured query graphs and general sensor network topologies using simple heuristics and localized search algorithms. However, both of these prior art solutions risk never finding a good placement.

In addition, many of these prior art solutions assume that queries are generated at the same rate as the data and are applied to all data. They do not exploit the fact that some queries may be generated at lower rates such that they need only be applied to a fraction of the data generated.

It will be appreciated that there exists a need to determine the optimal network locations at which to execute specific query operations and store intermediate data objects. Intuitively, one would like to place the operators as close as possible to the edge devices (sensors) so as to reduce transmission costs. However, devices close to the edge are likely to have limited processing and storage capabilities. Thus they may not be capable of handling sophisticated queries.

It will also be appreciated that there exists a need to balance these conflicting effects so as to achieve the minimum overall cost in computation, storage and communication through an efficient dynamic reallocation of data processing resources.

Embodiments and aspects of the invention are described in detail herein and are considered a part of the claimed invention. For a better understanding of the invention with advantages and features, refer to the description and to the drawings.

SUMMARY OF THE INVENTION

Key features of embodiments of the present invention utilize the limited bandwidth, computation and storage capacities of a distributed network for efficient in-network processing in anticipation of a mix of queries that are only known stochastically.

Other key features of embodiments of the present invention determine the placement of various querying operators, and also account for the randomness of the querying process. Embodiments of the invention also account for different queries with different query frequencies and that only a subset of sensor data may actually be queried. Each query is associated with a given query graph, consisting of operators and data objects, that describes how a response to the query is obtained logically. Key features of the invention integrate operator placement and caching together by determining node assignment for both operators and intermediate data objects that yield the minimum total communication, computation, and storage cost.

In accordance with one embodiment of the present invention A method for dynamic reallocation of data processing resources for efficient processing of sensor data in a distributed network is provided. The method includes networking data objects, each data object initializing its respective data states; and each data object distributing its respective data states to at least one of the other data objects. The method also includes the at least one nearest neighbor data object receiving data states and determining a data processing cost associated with the received data states; and updating its respective data states if the data processing cost associated with the received data states is reduced.

The invention is also directed towards a system for dynamic reallocation of data processing resources for efficient processing of sensor data in a distributed network. The system includes networked data objects initializing and distributing its respective data states to at least one other data objects. In addition, each of the networked data objects is either a relay node, a sensor node, or a fusion node. Each node includes a data transmission cost $f_t$ module for cost associated with transmission of the sensor data; a data processing cost $f_p$ module for cost associated with data processing of the sensor data; a data storage cost $f_s$ module for cost associated with data storage of the sensor data; and a data query Q minimization module for minimizing cost associated with data transmission cost.

Technical Effects

As a result of the summarized invention, technically we have achieved a solution which improves dynamic reallocation of data processing resources for efficient processing of sensor data in a distributed network.

In accordance with one embodiment of the invention, a program storage device readable by a machine, tangibly embodying a program of instructions executable by the machine to perform a method for A program storage device readable by a machine, tangibly embodying a program of instructions executable by the machine to perform a method for dynamic reallocation of data processing resources for the efficient processing of sensor data within a plurality of nearest neighbor nodes. The method includes determining a data transmission cost $f_t$ of the sensor data for each of the plurality of nearest neighbor nodes; determining a data processing cost $f_p$ of the sensor data for each of the plurality of nearest neighbor nodes; determining a data storage cost $f_s$ of the sensor data for each of the plurality of nearest neighbor nodes; and determining a data query Q which minimizes $f(f_t+f_p+f_s)$.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 11 is pseudo code which may be utilized to implement a method and system of the present invention shown in FIG. 1;

FIG. 13 is enabling description of features of the present invention shown in FIG. 1;

FIG. 14 is enabling description of features of the present invention shown in FIG. 1.

DETAILED DESCRIPTION OF THE INVENTION

Figure 1:
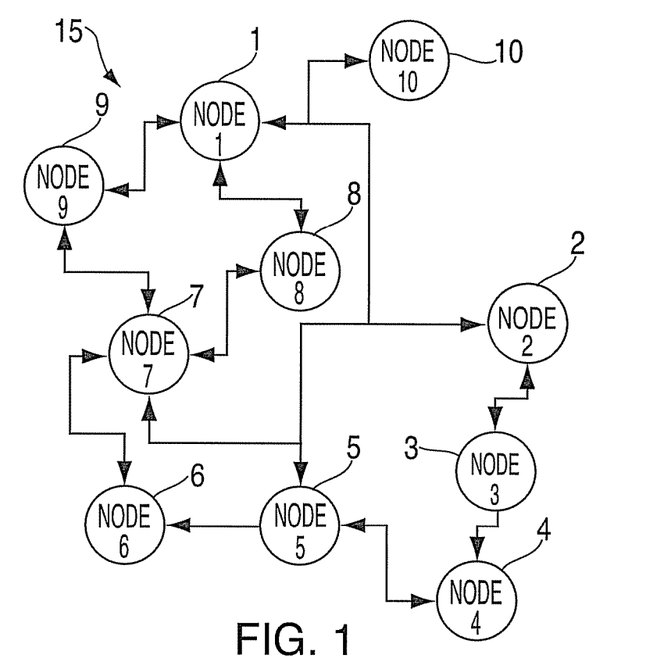
FIG. 1 is a pictorial diagram of a an exemplary data stream processing environment with distributed data sources that provide data streams incorporating features of the present invention.

Referring to FIG. 1, there is shown an exemplary data stream processing environment with distributed data sources that provide data streams. The environment may consist of any suitable number of nodes, 1-10, (sensors and edge servers), capable of executing multiple stream-oriented operators. These nodes 1-10, which may be geographically dispersed, are organized into a network 15 and collectively provide a rich set of query processing services for multiple concurrent stream-based applications.

Figure 15:
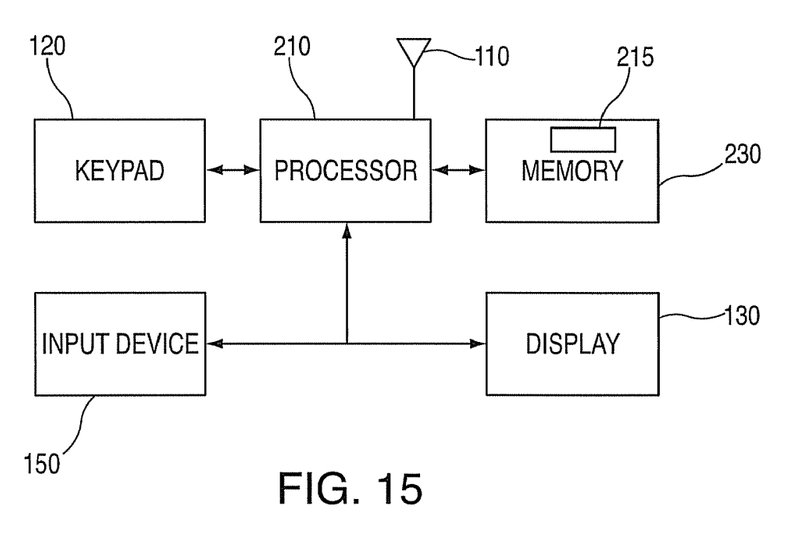
FIG. 15 a pictorial representation of a data processing system which may be utilized to implement a method and system of the present invention.

Referring also FIG. 15, there is shown a block diagram of a node incorporating features of the present invention shown in FIG. 1. It will be seen that in FIG. 15 there is shown input devices keypad 120, and input device 150. Also shown is display 130 and antenna 110. Node 100 includes a processor 210 that is coupled to the antenna 110, keypad 120, display 130, and input device 150. Input device 150 may be any suitable physical sensor that monitors the environment and collects data. Antenna 110 may be any suitable network connection such as a local area network (LAN), a wide area network (WAN) and/or any suitable network connection.

In addition, processor 210 is also coupled to a memory 230. Memory 230 may include any combination of volatile and non-volatile memory. Processor 210 takes input from keypad 120, antenna 110, and memory 230, and generates appropriate output on display 130, antenna 110, and/or memory 230. For clarity the FIG. 15 diagram shows only the most commonly-known components and features that allow a complete description of the preferred embodiments of the present invention.

Still referring to FIG. 15 memory 230 also contains database 215. Database 215 may contain a data transmission cost $f_t$ module for cost associated with transmission of the sensor data; a data processing cost $f_p$ module for cost associated with data processing of the sensor data; and a data storage cost $f_s$ module for cost associated with data storage of the sensor data; and a data query Q minimization module for minimizing cost associated with data transmission cost, data processing cost, and data storage cost.

As used herein, a node includes any device for providing data output. However, one skilled in the art will recognize that the teachings herein may be used with a variety of data devices other than the node shown in FIG. 15. Accordingly, nodes such as shown in FIG. 15 are merely illustrative of certain embodiments for data processing resources.

The sensor network 15 is represented by a directed graph $G_N(V,E)$, as illustrated in FIG. 1. The edges of the network 15 correspond to communication links which could be wired or wireless. Also, if $(i, j) \in E$, then $(j,i) \in E$. That is, communication is feasible in both directions for every pair of connected nodes 1-10. Also, $|V|=N$, and there are at least three types of nodes in the network: e.g., sensor nodes, relay nodes, and a fusion center.

Sensor nodes: Sensor nodes may be any suitable physical sensor that monitors the environment and collects data. They may or may not have the capability to process data. Sensor nodes may be, for example, a thermometer, smoke detector, or a camera. It will be appreciated that a sensor node may be any suitable device that responds to a physical stimulus such as heat, light, sound, pressure, magnetism, or motion, and transmits a resulting impulse or signal. It will also be understood that any suitable sensor node will contain the logic and resources necessary for the dynamic reallocation of data processing resources for the efficient distributed processing of sensor data.

Relay nodes: Nodes that receive and forward data. In general, relay nodes have the capability of processing data.

Fusion center: The node to which users make queries and obtain responses based on sensor data.

These nodes have varying computation and data transmission capabilities. They may also have storage space to cache data. Further, each node only has local knowledge about its neighboring nodes. Let $\Phi_i$ denote the set of the neighbors of node i such that for each $j \in \Phi_i$, $(i,j) \in E$ or $(j,i) \in E$.

Discrete Stream-Based Data Generation

Sensor nodes monitor and collect data about the environment by sampling it periodically. Further, time may be discretized, i.e., each sensor takes one sample during a time frame. Then, a snapshot of the whole environment may taken by the network at each time frame or any suitable time frame. Note that it does not require strict synchronization of the various nodes in the network. Each node simply needs to index the snapshots in sequence. For clarity, the following description focuses on a single snapshot. However, it will be appreciated that any suitable number of snapshots may be used.

Query Graph

Still referring to FIG. 1, the network 15 supports a set of queries. Each query Q is represented by a query graph $G_Q$, consisting of operators and data objects. Such a graph can be built either directly by the user, or derived by a query planner. In general, the query graphs are logical graphs depicting the interaction between various operators and data objects. The query graphs presented herein are decoupled from the physical network topology so as to focus more on the semantics and work flow relations and better describe embodiments of the present invention.

It will be understood, however, that an underlying physical network will contain the logic and resources necessary for optimizing dynamic reallocation of data processing resources for efficient distributed processing of sensor data in accordance with embodiments of the invention presented herein.

A query graph is a directed acyclic graph (DAG) $G_Q=(V_o, V_d, E)$ that describes how a response to the query is obtained logically. Here, Vo is a set of operators, Vd is a set of data objects. In words, a query graph consists of data objects and operators, where the operators are essentially programs which aggregate or process existing data to generate new data.

Figure 2:
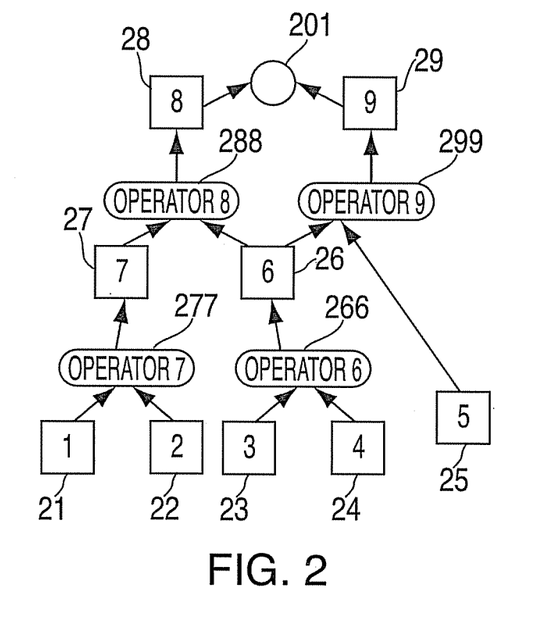
FIG. 2 is a pictorial diagram of a an exemplary data stream processing environment with distributed data sources that provide data streams incorporating features of the present invention

Referring to FIG. 2, there is shown a query graph. For example, Operator-7 (item 277) generates intermediated data-7 (item 27) and requires as inputs data-1 (item 21) and data-2 (item 22). Likewise, Operator-6 (item 266) generates intermediate data-6 (item 26) and requires as inputs data-3 and data-4, items 23 and 24, respectively. Operator 8 (item 288 generates final data-8 (item 28) and requires as input intermediate data-7 and data-8, items 27 and 28, respectively. Similarly, Operator-9 generates final data-9 (item 29) and requires as input intermediate data-6 (item 26) and data-5 (item 25). Let $|V_d|=M$. In a preferred embodiment the data objects are divided into three classes:

(1) Sensor data (raw data): Data generated by the sensor nodes, e.g., data-1 (item 21), data-2 (item 22), data-3 (item 23), data-4 (item 24), and data-5 (item 25) in FIG. 2. It will be appreciated that any suitable number of sensor nodes generating sensor data may be used;

(2) Final data: Answers to the query, e.g., data-8 (item 28) and data-9 (item 29) in FIG. 2. The final data needed to be delivered to fusion center 201; and (3) Intermediate data: Data that are neither sensor data nor final data, for example data-6 (item 26) or data-7 (item 27) in FIG. 2.

For purposes of description clarity, only one data object generated by each operator is shown. Thus the operator can be assigned the same label as the data generated. It will be understood that each operator may require multiple data objects as input, and each data object may be requested as input by multiple operators.

As previously mentioned, one snapshot of the environment is created at each time slot. Also queries may be generated at a lower rate and that they are applied only to a fraction of the data generated, therefore, for a given query Q with query graph $G_Q$, each snapshot will be evaluated by $G_Q$ with probability q.

Note the following notations:

Δk: The set of data objects in Vd that are needed to generate data object k. For example, $\Delta 7=\{1,3\}$ in FIG. 2. We refer to the data objects in Δk as children of data k.

Dk: The number of bits of data k.

The sensor network $G_N$ is given and a query Q (with query graph $G_Q$) is posed at the fusion center (FIG. 2, item 201). In accordance with an embodiment of the present invention a method for efficiently obtaining the final answer to the query is provided. It will be appreciated that some prior art solutions transmit all sensor data to the fusion center, and let the fusion center do the processing and aggregation. But this can be very expensive in the case that high volume data sources are involved, and the final answer could be very simple. In a preferred embodiment, one method is to allow partial processing and aggregation within the network (FIG. 1, item 15), where the data are combined or filtered in the network (FIG. 1, item 15) so as to reduce the number of transmissions.

Query Processing Scheme

A query processing scheme (Π,R,Ω) in accordance with an embodiment of the present invention solves the following three problems.

(1) Operator Placement (Π): Let Π denote the operator placement matrix such that Π(k,i)=1 if data k is generated at node i. That is, the operator generating data k is placed at node i. For clarity, assume each operator can be placed at only one node, thus $\Pi(k, j)=0$ for all $j \neq i$. Although redundant placement may be beneficial, especially when data k is requested by multiple upstream operators.

(2) Routing (R): Give a placement of operators, route the data from the node it is generated to the node it is required as input. For example, all data in $\Delta k$ (children of data k) need to be transmitted to node i as these are required input data in order to generate date k.

(3) Data Caching ($\Omega$): Here, $\Omega$ is the caching matrix, $\Omega(k, i)=1$ if data k is cached at node i.

Routing and operator placement clearly impact the efficiency of the query processing. It may be less obvious why one should be concerned with data caching. Consider two simple caching schemes:

(1) PULL: Cache the raw data where they are generated. Transmit and process relevant data only when a query is acquired.

(2) PUSH: Transmit and process all raw data for all queries and deliver results to the fusion center.

The disadvantage of PULL is that it requires the fusion center to signal the sensor nodes each time that data is needed. This incurs a communication cost with each query; the advantage is that the data are only transmitted when a query is made.

The disadvantage of PUSH is that it is always transmitted to the fusion center. In the absence of a query, a communication cost is always incurred. This may limit the total number of queries that can be supported. The advantage is that no additional transmission is required at the time of a query.

Thus, the choice of PULL or PUSH depends on q. If q=1, i.e., we know for sure that a query is made on each snapshot, PUSH is the best choice. Similarly, if q is zero or close to zero, PULL is best. On the other hand, when q lies between zero and one, it may be more beneficial to cache data at nodes in the middle of the network. This may produce a cost savings over that of PUSH or PULL. Thus, choosing the proper location at which to cache the (intermediate or final) data should also be considered when designing efficient query processing schemes.

Cost Metrics

A query process scheme (R, $\Pi$, $\Omega$) is given for query Q with query graph $G_Q$ on sensor network $G_N$. Let $f_{cost}$ ($G_N, G_Q, R, \Pi, \Omega$) denote the cost of this scheme; it accounts for three different costs.

(1) Transmission cost $f_t(G_N, G_Q, R, \Pi, \Omega)$: The cost used to transmit the data. Let $r_t(i,j)$ denote the cost to transmit one unit of data over link (i,j). In general, $r_t(i,j)=r_t(j, i)$.

(2) Processing cost fp $(G_N, G_Q, R, \Pi, \Omega)$: The cost of processing and aggregation. Let $r_p(k,i)$ denote the cost to generate data k at node i. For the sensor data, $r_p(k, i)=0$ if data k is pinned to node i; and $r_p(k,i)=\infty$ otherwise.

(3) Storage cost fs $(G_N, G_Q, R, \Pi, \Omega)$: The cost used to store/cache the data. Let $r_s(i)$ denote the cost of storing one unit data at node i. If there is no storage space available at node i, $r_s(i)=\infty$.

Thus, the total cost of scheme (R, $\Pi$, $\Omega$) is $f_{cost}$ ($G_N, G_Q, R, \Pi, \Omega$)=(ft+fp+fs) ($G_N, G_Q, R, \Pi, \Omega$).

Minimum Cost Optimization

An embodiment of the present invention determines the query process (R*, $\Pi$*, $\Omega$*) that solves:

arg min $f_{cost}(G_N, G_Q, R, \Pi, \Omega)$. (Problem 1)

Consider a special case where the holding cost is zero and q=1. In this case, PUSH is the best caching scheme and the optimization problem simplifies to:

$(R^*, \Pi^*) = \arg\min f_{cost}(G_N, G_Q, R, \Pi)$.

Even for this case, the optimization problem is known to be $N_P$-Complete as known in the prior art. It is known in the art that the optimization problem can be solved using a centralized algorithm when the query graph has tree structure with complexity O ($M_N 2$): Recall that N is the number of nodes in the network and M is the number of data items in the query graph.

However, while centralized algorithms known in the art solves the optimization problem, it has disadvantages solved by embodiments of the present invention. For example, the prior art requires the fusion center (FIG. 2, item 201) to know the entire topology of the network. Furthermore, when the network topology changes, say due to the failure of a node, the whole scheme needs to be re-calculated. Thus, in a preferred embodiment of the present invention the nodes (FIG. 1, Items 1-10) only need to know the information of their neighbors and the optimal scheme is obtained by exchanging information between neighboring nodes.

Figure 3:
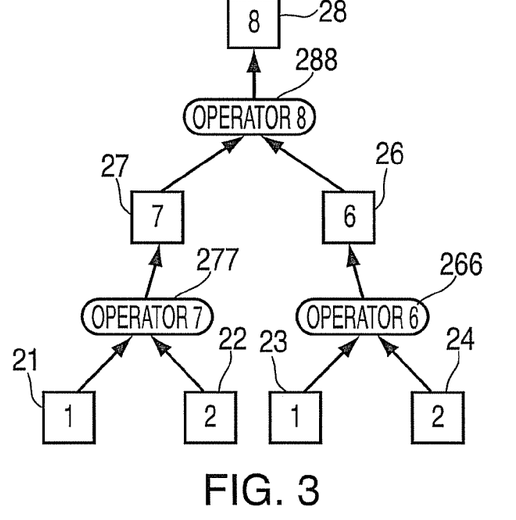
FIG. 3 is a pictorial diagram of a an exemplary tree data stream processing environment with distributed data sources that provide data streams incorporating features of the present invention shown in FIG. 2.

Referring to FIG. 3, there is shown a tree structured query graph. Distributed methods, in accordance with embodiments of the present invention, which solve the general optimization problem with complexity O(M $2_N$ 3) are provided herein. Furthermore, these methods allow the optimal scheme to be re-calculated very efficiently as the network topology changes. After investigating the tree structure, heuristic solutions will be provided for general structured queries.

Tree Structured Queries

In this section, embodiments of the present invention provide solutions to the optimization problem for the case that the query has a tree structure, e.g., FIG. 3. For a first example a special case where q=1 and the holding cost is zero is considered. Then the method, in accordance with embodiments of the present invention is extended to the case where q $\in$ (0, 1) and the holding cost is not zero.

Minimum Cost Routing and Operator Placement

First, let q=1 and the holding cost is zero. From the description above, it is will be understood that the best caching scheme is PUSH since every snapshot will be queried. Thus, $(R^*, \Pi^*) = \arg\min f_{cost}(G_N, G_Q, R, \Pi)$.

During the process of solving the optimal placement in a distributed fashion, each node, i, maintains for each data item k the following information: Cp(k,i), Fp(k,i), $\Pi$p (k,i) and I (k,i). In particular, Cp (k,i) is the current cost of the best query process scheme to obtain data k at node i; Fp(k,i) is the neighbor that transmits data k to node i in the current scheme; $\Pi$p(k,i)=1 if data k is generated at node i in the current scheme, and =0 otherwise; and I (k,i)=1 if the state of data k has been updated, but not been distributed to node i's neighbors, and =0 otherwise.

Figure 9:
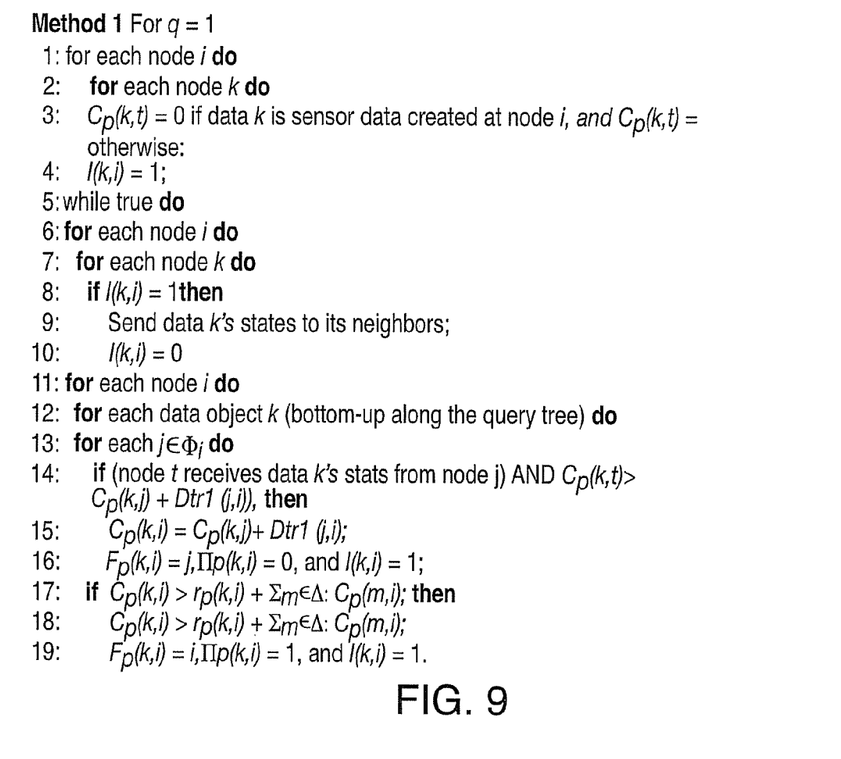
FIG. 9 is pseudo code which may be utilized to implement a method and system of the present invention shown in FIG. 1.

The distributed optimal placement method is given in Method 1 shown in FIG. 9. First the states of the data are initialized according to lines 1-4, and then, the following two steps are executed repeatedly:

(i) Lines 6-10: If I (k,i)=1, which means data k's states at node i have been updated but not distributed to node i's neighbors, then node i sends data k's states to all its neighbors and I (k,i) is set to zero.

(ii) Lines 11-19: According to the information received from its neighbors, node i checks whether it should update the states of its data. For each data k, node i first checks the cost is reduced by obtaining data k from its neighbors (lines 13-16). Then, node i checks whether it is better to generate data k at node i (lines 17-19). Let I (k,i)=1 if data k's states are updated.

The method terminates when no additional information is exchanged between nodes. Note that the method in this embodiment is synchronous, nodes have to wait for the completion of step (i) to execute step (ii), and wait for the completion of step (ii) to execute step (i).

Method 1 shown in FIG. 9, solves the optimization problem with M (N−1) iterations. For understanding, note the following definitions:

(1) Routing path α (k,i,j): A path over which data k flows from node j to node i.
(2) Data collection tree β (k,i) rooted at node i: A tree over which data k flows to node i. If data k is the sensor data generated at sensor j, then β (k,i)=α (k,i,j). If data k is an intermediate data or the final data, and generated at node j, then β (k,i)=α (k,i,j) ∪ (∪m ∈$\Delta_{k\beta}$ (m,j)).
(3) Depth H (β): The maximum path length from the root to a leaf. If data k is the sensor data, H (β(k,i)) is the number of hops path β (k,i) tales; otherwise if data k is an intermediate data or the final data, and generated at node j, $$H(\beta(k,i)) = H(\alpha(k,i,j)) + \max H(\beta(m,j)).$$

Referring to FIG. 13, there is shown a theorem and corresponding proof that, in accordance with embodiments of the present invention, $Cp_0(k,i) = \Gamma_{p0}(k,i)$, and that $$Cp(k,i) = \Gamma_{pn}(k,i)$$

for data k such that Δk=/0. Then, by induction on n and on the query tree (from the leafs to the roots), we conclude that equation (1) shown in FIG. 13 holds for all n, k and i. Since there are N nodes and M data objects, in the worst case, $$H(\beta(\text{Final Data, Fusion Center})) = M(N-1).$$

Further, there are N nodes in the network, and at each step, each nodes send at most $M_N$ messages. Thus, the number of messages exchanged is O(M2N 3). Method 1 shown in FIG. 9, embeds the query graph into the sensor network (FIG. 1, item 15). Each participating node (items 1-10) knows the identities of the neighbors from which to obtain data, but not the nodes to which it delivers data. The network then executes the following trace back process.

(i) Generate message (Data k*) at the fusion center, e.g., FIG. 2, item 201, where data k* is the final data.
(ii) If node i receives message (data k) from node j, it needs to transmit data k to node j whenever data k is available. Furthermore,
  (a) If Π(k,i)=1, node i sends message (data m) to node Fp (m,i) for each m ∈ $\Delta_k$, and node i needs to generate data k whenever data k's children are available.
  (b) If Π(k,i) 6=1, node i sends message (data k) to node Fp (k,i).

It will be readily understood by those skilled in the art that each node will know how to transmit and process data according to (R*,Π*) after the trace back process terminates.

Distributed Caching

In the previous subsection, the example focused on the case where q=1 corresponding to the situation where every data snapshot is queried. In this subsection, an example of a more realistic case, i.e., where q<1 is provided; the user does not query every snapshot, but only those data in which it is interested. As described earlier, PUSH is the optimal scheme for q=1. But for q<1, caching can further reduce the cost. Now, any caching scheme must account for the fact that different nodes have different amounts of storage space. For example, a sensor node, e.g., items 21-25 shown in FIG. 2, may only have limited storage space; on the other hand, a relay node, items 7-8 shown in FIG. 2 and the fusion center, item 201 may have substantial storage. Thus, a preferred embodiment of the present invention caches data at nodes with substantial storage, and associates different holding costs to different nodes to reflect this fact. Also, when cache data in the middle of the network, the nodes caching the data need to be notified each time a query is generated. For purposes of discussion, assume the size of the signaling message needed to do this is Dq.

In this subsection, a distributed method that determines the minimum cost scheme is provided in accordance with embodiments of the present invention. First, each node i needs to maintain for each data k the following information: Cp (k,i), Fp (k,i), Πp(k,i), Cs (k,i), Fs (k, j), Πs (k,i), Ω(k,i) and I (k,i). In particular, Cp (k,i), Fp (k,i) and Πp (k,i) are associated with the current best processing scheme to obtain data k at node i; while Cs (k,i), Fs (k,i), Πs(k,i), and Ω(k,i) are associated with the current minimum cost scheme involving caching, where Ω(k,i) represents the caching decision with Ω(k,i)=1 if data k is cached at node i, and 0 otherwise.

It will be understood by those skilled in the art that $\Gamma_{pn}$ (k,i)+$r_p$ (k,i) is the minimum cost to cache data k at node i, among all data collection trees β (k,i) such that H (β (k,i))≦n. So Cp (k,i), Fp(k,i) and Πp (k,i) are used to check whether caching data k at node i is better than pulling data k from other nodes when the query is injected.

If the final data, i.e., data from data-8, item 28 and/or data-9, item 29, shown in FIG. 2, is not pushed to the fusion center 201, the sensors or the nodes caching the data each time a query is injected are notified. Thus, to obtain the minimum cost query processing scheme, the minimum cost path to transmit the required signaling messages is required.

Referring to FIG. 11, there is shown Method 3 for finding the minimum cost path to transmit the required signaling message. Thus, node i needs to maintain for each node j (not just for j ∈ $\Phi_i$) the following information: R(i,j), G(i,j) and Ib (i,j). In particular R(i,j) is the current cost to transmit one unit of data from node i to node j; G(i,j) is the next hop node i should take to reach node j; and Ib(i,j)=1 if the information has been updated, but not distributed to node i's neighbors.

Figure 10:
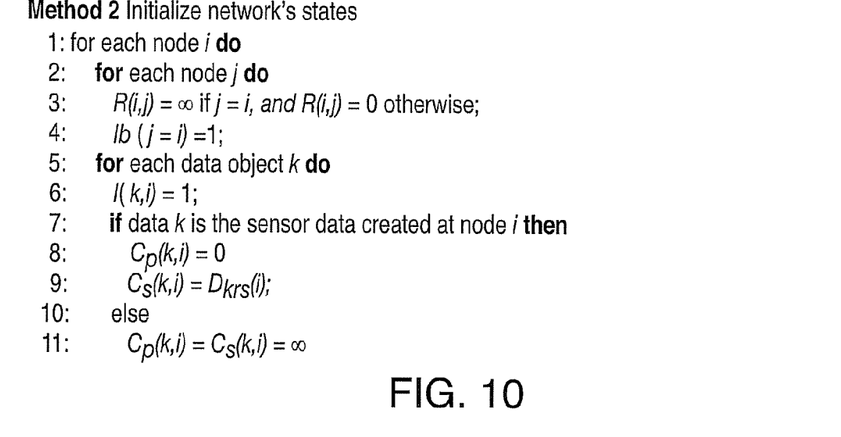
FIG. 10 is pseudo code which may be utilized to implement a method and system of the present invention shown in FIG. 1.

Still referring to FIG. 11, the distributed method to obtain the minimum cost scheme is given as Method 3. Similar to Method 1 shown in FIG. 9, Method 3 first initializes the network states according to Method 2 shown in FIG. 10. After that, Method 3 repeats following two steps:

(i) Lines 3-8: If node i's state has been updated, node i needs to send the updates to its neighbors.
(ii) Lines 9-31: Node i updates its state according to the information received from its neighbors. It first uses the distributed Bellman-Ford algorithm, or any suitable method, to update R(i,j), G(i,j) and Ib (i,j) (lines 10-13). Then, node i updates the cost related to caching (lines 17-19 and lines 23-25). Finally, for each data k, node i compares the current scheme with three different schemes according to the updated information received: (1) Obtain data k from node j(j ∈ $\Phi_i$) when the query is injected (lines 20-22); (2) Compute data k at node j when the query is injected (lines 26-28); (3) Cache data k at node j (lines 29-31). If one of three schemes is better, node i chooses that scheme and updates data k's state.

FIG. 14 shows that Method 3 shown in FIG. 11 converges to the optimal scheme within N+M(N−1) iterations.

Similar to Method 1, FIG. 9, the following trace back process is provided:

(i) Generate message (Data k*, Pull) at the fusion center, where data k is the final data.
(ii) If node i receives message (Data k, Pull) from node j, then
 (a) If $\Pi s\,(k,i)=1$ and $\Omega(k,i)=1$, node i sends message (data in, Push) to node Fs(m,i) for each $m \in \Delta k$, and needs to generate data k whenever data k's children are available.
 (b) If $\Pi s(k,i)=1$ and $\Omega(k,i)=0$, node i sends message (data m, Pull) to node Fs(m,i) for each $m \in \Delta k$, and needs to request data m from node Fs (m,i) for each $m \in \Delta k$ when there is a request for data k at node i.
 (c) If $\Pi s\,(k,i)=0$ and $\Omega(k,i)=1$, node i sends message (data k, Push) to node Fs(k,i).
 (d) If $\Pi s\,(k,i)=0$ and $\Omega(k,i)=0$, node i sends message (data k, Pull) to node Fs(k,i), and needs to request data k from node Fs (k,i) when there is a request for data k at node i.

If node i receives message (Data k, PUSH) from node j, it needs to transmit data k to node j whenever data k is available. Furthermore,
 (a) If $\Pi s(k,i)=1$, node i sends message (data in, Push) to node Fs (m,i) for each $m \in \Delta k$, and needs to generate data k whenever data k's children are available.
 (b) If $\Pi s\,(k,i)=0$, node i sends message (data k, Push) to node Fs (k,i).

Asynchronous Methods

Methods 1 and 3 shown in FIG. 9 and FIG. 11, respectively, execute in a synchronous way. For example, referring to FIG. 9, nodes begin to update their states (lines 11-19) only after all nodes finish distributing the updated information to their neighbors (lines 6-10); similarly, nodes begin to send out their updated information only after all nodes finish updating their states. This requires that all nodes be fully synchronous and know when other nodes finish updating and finish sending out updated information.

Figure 12:
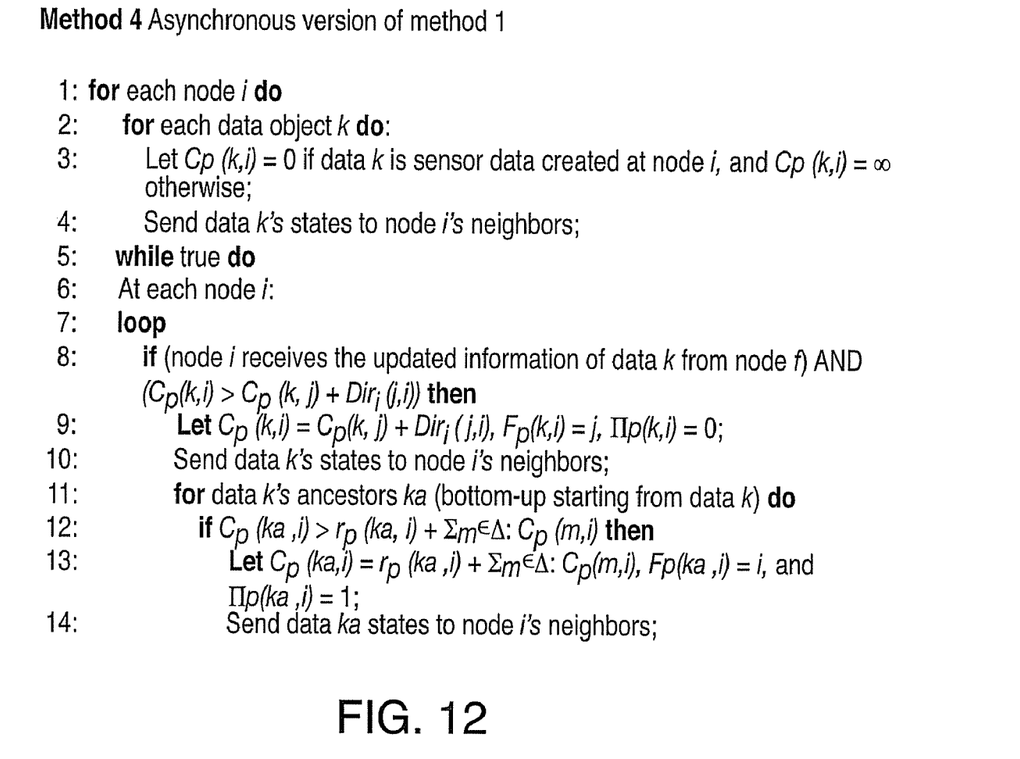
FIG. 12 is pseudo code which may be utilized to implement a method and system of the present invention shown in FIG. 1.

In this embodiment, Method 4, the methods are operated in an asynchronous way. Thus, each node updates its states right after it receives information from its neighbors; and sends updated messages to its neighbors right after its states are updated. For example, an asynchronous version of Method 1 is shown in FIG. 12, Method 4, and we can obtain the asynchronous version of Method 3 similarly. When the methods execute asynchronously, the methods are fully distributed.

Cost and Topology Change

Communication, computation, and storage costs may change over time. Furthermore, links can fail. In this section the methods shown above are modified to accommodate such changes.

An example of a change is where one of the costs decreases, e.g., node i's storage cost decreases due to the addition of storage space to node i. It will be understood that it suffices to re-initiate execution of the methods (node i first updates its states according to the decrease in cost and then distributes the updated information to its neighbors, and then all nodes begin to exchange information). The method will converge to the new optimal scheme in a finite number of steps.

Now consider the case of either a cost increase or a link failure (the cost is infinity). Simply executing the method will result in a "count to infinity" problem understood in the prior art. It may take an infinite number of iterations for the method to converge to the new optimal solution when a link fails, or B iterations to converge if the cost increase is B. Alternate methods may be used in these situations. Once such method includes the following two parts:
 (1) Freeze: When the cost of a node or a link increases, it sends out freeze messages. All data collection trees containing that node or that link are frozen except for modifying the costs. Then, the costs are re-calculated according to the cost change. For example, consider Method 1 shown in FIG. 9, suppose $\Pi s\,(k,i)=1$, and node i's processing cost increases by $\delta$, then
  (i) Node i first sets $Cp\,(k,i)=Cp(k,i)+\delta$. Then it checks the data h from the leaves to the root along the query tree. If $\Pi(h,i)=1$ and $Cp(m,i)$ changes for any $m \in \Delta h$, node i re-calculates $Cp(h,i)$. If $Cp(k,i)$ increases for any data k, node i distributes a freeze message (Data h, $Cp(k,i)$, Freeze) to its neighbors. Also, all states of node i are frozen, and can only be modified when freeze messages received.
  (ii) If node i receives (Data As, Cp (k, j), Freeze) from node j, it first sets $Cp(k,i)=Cp\,(k,\,j)+D_k r_t\,(j,i)$ if Fp (k,i)=j. Then, it checks and up dates all data h's states as in (i). If any Cp (k,i) increases, node i distributes freeze message (Data As, Cp(k,i), Freeze) to its neighbors. The states of node i are frozen, and can only be modified when a freeze message received.
 (2) Unfreeze: When the states of all nodes are updated according to the cost change, the nodes are unfrozen. After unfreezing, those nodes whose states are updated request their neighbors to send states to them, and then all nodes begin to exchange their information using the distributed algorithms. The algorithm terminates when there is no more information exchanged among nodes. Using this Freeze-Unfreeze scheme, the new optimal scheme can be obtained in finite steps.

Extensions

It will be appreciated that the distributed methods presented thus far solve the minimum cost query processing problem for tree-structured queries. Alternated embodiments of the present invention extend the methods to handle more general query graphs and to account for finite capacity on certain nodes.

General Queries

In this subsection, queries with more general underlying topologies are addressed. As described earlier, Problem 1 is $N_P$-Complete for the case of a general query graph. We propose a number of simple heuristics to handle this.

Heuristic 1: For a general query graph that is not a tree, such as in FIG. 2, where one data may have more than one parent. One alternate embodiment temporarily removes some edges so that the resulting graph becomes a tree or multiple trees. The methods presented thus far apply the distributed methods on each of the new trees to obtain the minimum cost scheme. Since each operator generates exactly one data object, it is only necessary to remove edges from data objects to operators, e.g. the edge from data-6, item 26 to operator 9, item 299 in FIG. 2.

Denote the optimal assignment $\pi^*$ for the original problem with total cost $C^*$. Similarly, denote $\pi'$ and $C'$ the assignment and total cost corresponding to the new trees and assert that $C' \leq C^*$. This is because the optimal placement $\pi^*$ is clearly feasible for the new trees, however, $C'$ does not need to include the transmission cost on the removed edges, thus must be smaller than $C^*$. Now adding back to $C'$ the transmission cost $\Delta$ of the removed edges, yields a feasible solution to the original problem. Hence $C^* \leq C'+\Delta$. Therefore, if the query graph is tree-like such that one only needs to remove a limited number of edges to have tree structures, the distributed method is suitable for tree-like structures.

Figure 4:
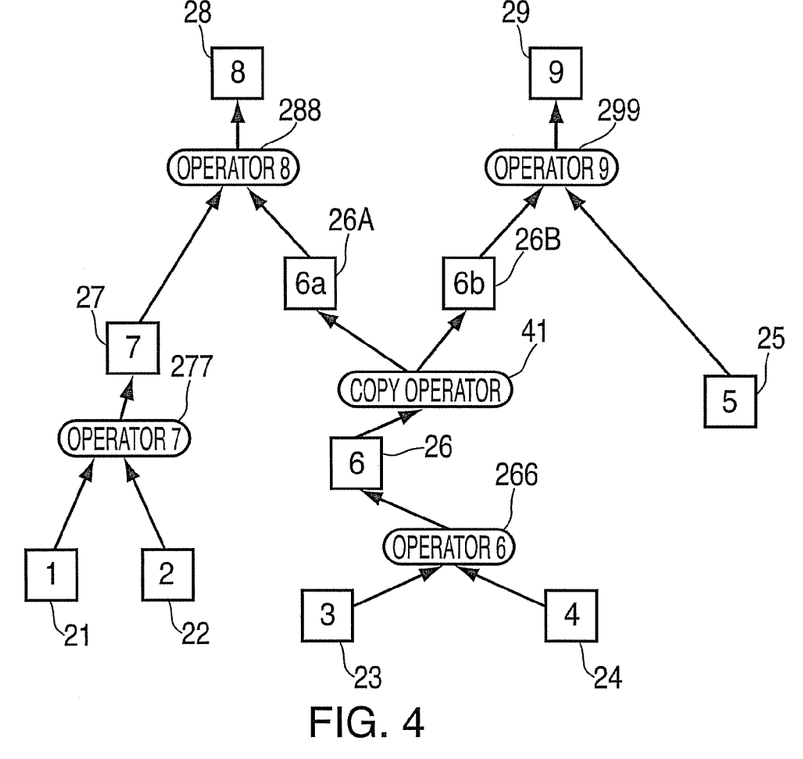
FIG. 4 is a pictorial diagram of a an exemplary data stream processing environment with distributed data sources that provide multiple data streams incorporating features of the present invention shown in FIG. 2.

Heuristic 2: There exists one set of queries for which we can easily adapt our earlier methods for trees to obtain the optimal solution. Transforming the graph shown in FIG. 2 to the graph in FIG. 4 by replacing the edges from data data-6, item 26 to operator 8, item 288 and operator 9, item 299 by a subgraph consisting of a three nodes, copy operator 41 and two data items, 6a, item 26A and 6b, item 26B. Edges are added from data-6, item 26 to the copy operator 41, from the copy operator 41 to data items, 6a, item 26A and 6b, item 26B, and from 6a, item 26A to operator 8, item 288 and from data 6b, item 26B to operator 9, item 299. A computation cost of zero is associated with the copy operator 41.

Figure 5:
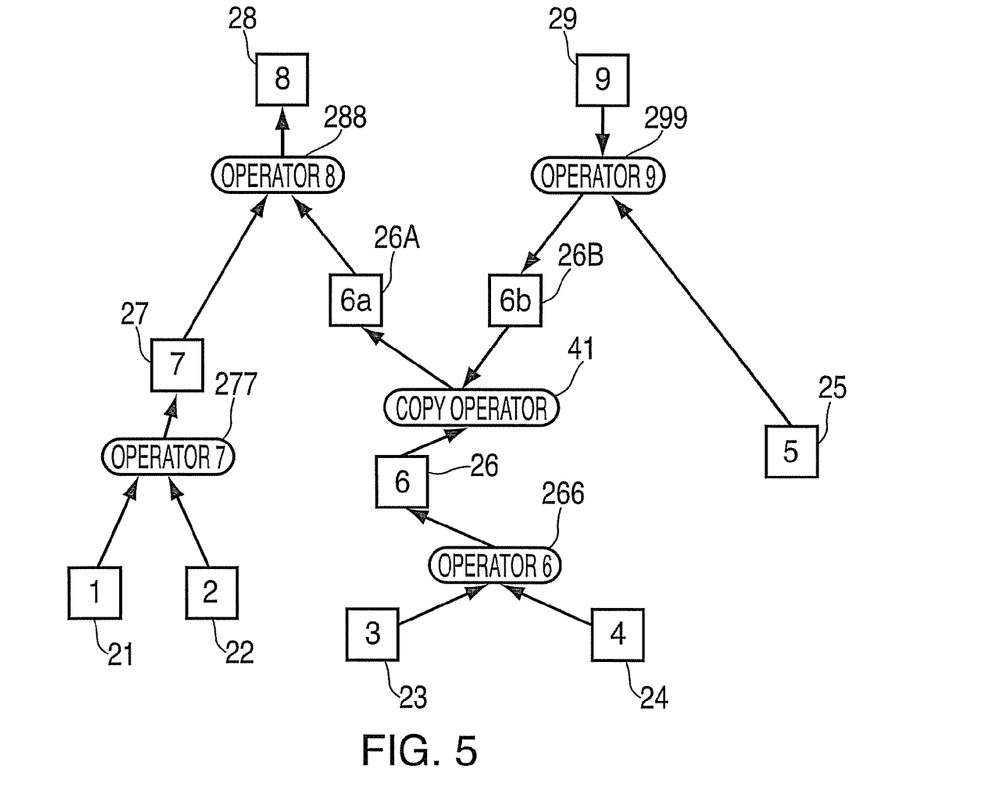
FIG. 5 is a pictorial diagram of another exemplary tree data stream processing environment with distributed data sources that provide data streams incorporating features of the present invention.

Next we reverse the edges from operator 9, item 299 to data-9, item 29, copy operator 41 to data-6b, item 26B, and from 6b to operator 9, item 299. The resulting graph is then of a tree structure shown in FIG. 5. Now apply Method 1 shown in FIG. 9 with the following modification. During tracing and deciding whether or not to add a physical link, say (i,j), to a path corresponding to an edge within the query graph that has been reversed, use a communication cost of $r_t(j,i)D_k$ rather than $r_t(i,j)D_k$. This accounts for the fact that the data will actually travel in the reverse direction. In the case of Method 2, shown in FIG. 10, the modification is similar, in fact it corresponds to switching the signaling costs with the data costs for the edges of the query graph that have been reversed as well as the directions of the links traversed, i.e., $r_t(j, i)D_k$ rather than $r_t(i, j)D_k$. Last, in both cases the back tracking phase must be modified to account for the reversed edges properly.

Note that the transformation that was described earlier is not special to the query graph illustrated in FIG. 2. It can be applied to any suitable query graph whose maximum node out degree is two. The resulting scheme is optimal over the class of all schemes that do not allow operators to be replicated. This approach also applies for query graphs with higher out degree. For example, a query graph that has a data object with out degree three. In this example there are three different orderings, each of which requires two copy operators. In order to obtain the optimal solution, each combination has to be treated separately and the one achieving the minimum cost identified after all three instances have been solved. It will be understood that as the out degree grows, the computational requirements grows exponentially.

Finite Capacity Constraints

So far we have assumed that there are no constraints on the computation capacity and storage space. However, it will be appreciated that in some scenarios there may have constraints on the total amount of capacity available at certain nodes. In this section, we provide some heuristics to address the problem.

In accordance with one embodiment of the present invention, the method increases the cost coefficients at the nodes that are severely capacity constrained. Consider, for example, a sensor node k has little space for storage, making the cost of storing a unit of data there extremely high will discourage the distributed methods presented herein to store a data object at node k.

Another solution is to perform a form of distributed bin packing. For example, after an initial run of the distributed method, it is found that the assignment violates the capacity constraint associated with node k. An embodiment of the distributed method in accordance with the present invention can then take out the minimum number of assigned items to meet the capacity constraints and re-allocate them to nearby nodes that have residual capacity.

A third approach in accordance with embodiments of the present invention is to introduce cost functions so that the cost is extremely high or infinite whenever reaching the fall capacity of a given node. Thus, dynamic network rate control is established. It will be appreciated that the cost functions may be linear or non-linear.

The following sections highlight the advantages of the embodiments of the invention described above. A first comparison highlights tree-structured queries and shows that the distributed method in accordance with embodiments of the invention presented herein can significantly reduce the cost of query processing.

Figure 6:
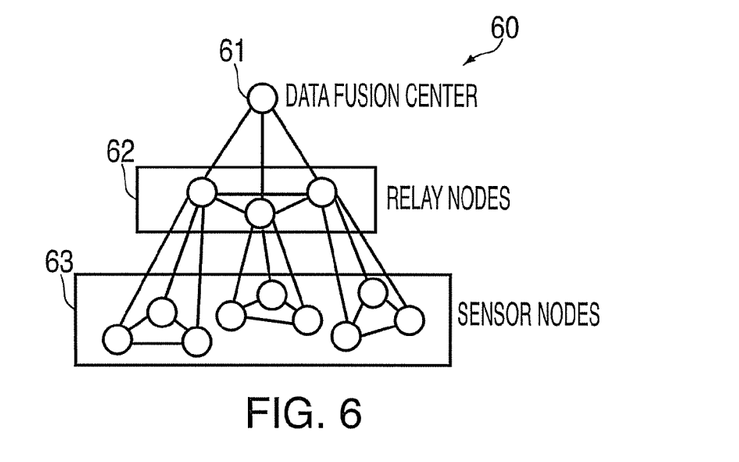
FIG. 6 is a pictorial representation of a three-tier sensor network incorporating features of the present invention shown in FIG. 1.

Referring to FIG. 6 there is shown a three-tier sensor network 60. The highest tier is the fusion center 61, the middle tier is formed by relay nodes 62. Each relay node is responsible for several sensor nodes. The sensor nodes form the lowest tier 63. In simulations, the number of the relay nodes and the number of the sensors who connect to the same relay node are randomly chosen from [0,L]. L is varied from 5 to 20 to investigate the performance of the algorithms for the networks with different size.

Three-tier tree-structured query graphs are randomly generated. Each sensor data has probability ½ to be involved in the query, so there are approximately L2/2 sensor data in each query graph. To investigate general queries, first generate two non-overlap tree-structured queries, and then randomly add 10% additional linlks to connect the two trees. It is thus a tree-like query graph, and use Heuristic 1 to obtain the placement solution.

The communication cost per unit data of each link is randomly chosen from [0, 10], and the computation cost of each operator and the storage cost per unit data are chosen to so that the nodes in the higher tier have lower cost, and are approximately of the order of ⅒ of the communication cost. Embodiments of the invention are compared with the following two algorithms:

1. Simple-Push: The sensors transmit the data to the relay nodes after the data are generated. The relay node will process the data if possible and then transmit to the fusion center.
2. Simple-Pull: Fusion center signals the sensor nodes when the query is injected. Then the data are transmitted and processed as the Simple-Push.

Figure 7:
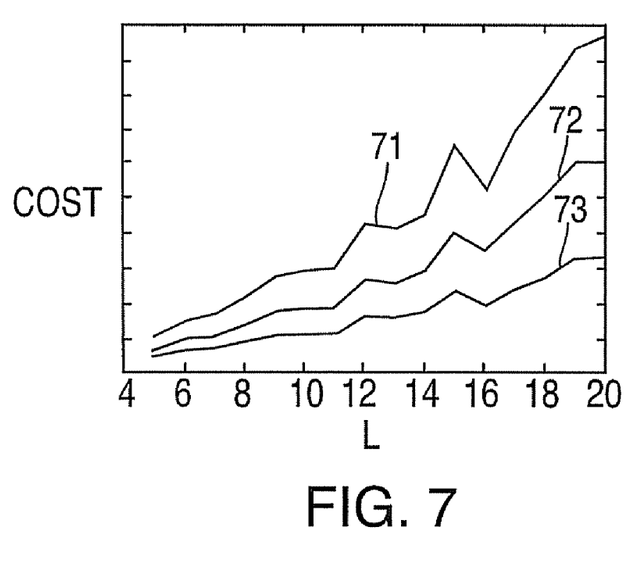
FIG. 7 is a graphical representation of two prior art solutions compared with a solution set provided by a method of the present invention.

Choosing L from 5 to 20 and for each fixed L, the simulation is executed 100 times, and at each time, a sensor network and a tree-structure query are randomly generated. Referring to FIG. 7, there is shown the average costs of the two algorithms described above (items 71 and 72). Further the cost of Method 3 (item 73) of an embodiment of the present invention is approximately ½ of the cost of the Simple-Pull (item 72) and ⅓ of the cost of the Simple-Push (item 71)

Figure 8:
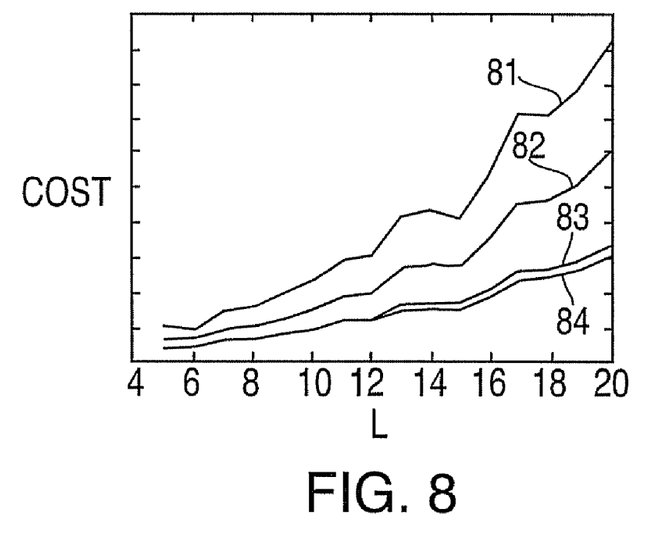
FIG. 8 is another graphical representation of two prior art solutions compared with a solution set provided by a method of the present invention.

Referring now to FIG. 8 there is shown Heuristic 1 as described above (item 83) compared with Simple-Pull 82 Simple-Push 81 and a lower bound 84 of the query processing cost as discussed earlier. Observe that Heuristic 1 (item 83 ) is very close to the optimal solution The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams described therein without departing from the spirit of the invention. The flow diagrams depicted herein are also just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. For example, any suitable IP protocol may be used. Such as, for example, Ipv4 or Ipv6. In addition, the previously described WECM or any suitable connection manager may be used. These claims should be construed to maintain the proper protection for the invention first described.

What is claimed is:

1. A method for dynamic reallocation of data processing resources for efficient processing of sensor data in a distributed network, the method comprising:
   networking a plurality of data objects:
   each of the plurality of data objects initializing its respective data states, including each of the plurality of data objects updating its respective data states;
   each of the plurality of data objects distributing its respective data states to at least one of the plurality of data objects, including each of the plurality of data objects distributing its respective data states to a nearest neighbor data object;
   the nearest neighbor data object receiving data states determining a data processing cost associated with the received data states, comprising:
      determining a data transmission cost ft;
      determining a data processing cost fp;
      determining a data storage cost fs; and
      determining a data query Q which minimizes f (ft+fp+fs), comprising:
         determining an operator placement matrix;
         routing data from the node where it is generated to the node where it is required as input; and
         determining a data caching matrix; and
   the nearest neighbor data object receiving data states updating its respective data states if the data processing cost associated with the received data states is reduced;
   wherein the distributed network is a sensor network, each of the data objects being one of relay node, a sensor node, or a fusion node;
   reallocating data processing resources in response to minimization of network data transmission cost, data processing cost and data storage cost by the data query Q.

2. A method as in claim 1 wherein each of the plurality of data objects distributing its respective data states to the nearest neighbor data object further comprises each of the plurality of data objects distributing its respective data states to at least one nearest neighbor data object synchronously.

3. A method as in claim 1 wherein each of the plurality of data objects distributing its respective data states to the nearest neighbor data object further comprises each of the plurality of data objects distributing its respective data states to the nearest neighbor data asynchronously.

4. A method as in claim 1 wherein networking the plurality of data objects further comprises:
   networking at least one sensor node;
   networking at least one relay node; and
   networking at least one data fusion center.

5. A method as in claim 1 wherein networking the plurality of data objects further comprises wireless networking the plurality of data objects.

6. A system for dynamic reallocation of data processing resources for efficient processing of sensor data, the system comprising:
   a distributed sensor network;
   a plurality of networked data objects in the distributed network,
   the data objects initializing and distributing its respective data states to at least one of the plurality of data objects,
   wherein each of the plurality of networked data objects comprises a node selected from the group consisting of a sensor node, a relay node and a data fusion center,
   wherein each of the plurality of networked data objects comprise:
      a data transmission cost ft module for cost associated with transmission of the sensor data;
      a data processing cost fp module for cost associated with data processing of the sensor data;
      a data storage cost fs module for cost associated with data storage of the sensor data; and
      a data query Q minimization module for minimizing cost associated with data transmission cost, data processing cost, and data storage cost, wherein the data query minimization module comprises:
         an operator placement matrix;
         a data caching matrix, wherein the data caching matrix comprises:
            at least one intermediate data caching matrix; and
            at least one final data caching matrix;
      wherein said reallocating data processing resources in response to minimization of network data transmission cost, data processing cost and data storage cost by the data query Q.

* * * * *